(12) United States Patent
Vandewall et al.

(10) Patent No.: US 11,352,138 B2
(45) Date of Patent: Jun. 7, 2022

(54) GALLEY CART WITH SELECTABLE MEAL PREPARATION

(71) Applicant: The Boeing Company, Chicago, IL (US)

(72) Inventors: Cynthia A. Vandewall, Snohomish, WA (US); Alberto de Icaza Mura, Cincinnati, OH (US); Kirsten M. McIntyre, Miamisburg, OH (US); Leigh Ann Popik, Twinsburg, OH (US); Ryan J. Reese, Cincinnati, OH (US); Joseph B. Lane, Cincinnati, OH (US); Craig Vogel, Cincinnati, OH (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 16/154,455

(22) Filed: Oct. 8, 2018

(65) Prior Publication Data

US 2020/0108932 A1    Apr. 9, 2020

(51) Int. Cl.
| | |
|---|---|
| *B64D 11/00* | (2006.01) |
| *B64D 11/04* | (2006.01) |
| *B64D 13/08* | (2006.01) |
| *F25D 17/04* | (2006.01) |
| *F25D 17/06* | (2006.01) |

(52) U.S. Cl.
CPC ......... *B64D 11/0007* (2013.01); *B64D 11/04* (2013.01); *B64D 13/08* (2013.01); *F25D 17/045* (2013.01); *F25D 17/06* (2013.01); *F25D 2700/08* (2013.01)

(58) Field of Classification Search
CPC .......... A47B 2031/002; B64D 11/0007; B64D 11/04; B64D 13/08; F25D 17/045; F25D 17/06; F25D 2700/08; F01D 21/045; F01D 25/005; F01D 25/24; F01D 5/02; F01D 9/042; F04D 29/321; F05D 2220/32; F05D 2240/12; F05D 2300/171; F05D 2300/175; F05D 2300/177; Y02T 50/671; G06Q 10/0833

USPC ..... 99/480; 219/386, 387; 62/126, 157, 231, 62/371, 457.2, 530; 701/3, 31.4, 34.4
See application file for complete search history.

(56) References Cited

U.S. PATENT DOCUMENTS

| | | | |
|---|---|---|---|
| 2005/0121978 A1* | 6/2005 | McAvoy | H02J 3/14 307/43 |
| 2009/0112378 A1* | 4/2009 | Robb | B64D 11/00155 463/31 |
| 2015/0041100 A1* | 2/2015 | Huang | A47B 31/02 165/42 |

(Continued)

OTHER PUBLICATIONS

Bauer, Monika; "INtelligentes Catering mit RFID", Available at URL:http://research.iao.fraunhofer.de/ebusiness/download/index. php?request_2010_Intelligentes_Catering_mit_RFID, Jan. 11, 2011.

*Primary Examiner* — Tu B Hoang
*Assistant Examiner* — Vy T Nguyen
(74) *Attorney, Agent, or Firm* — Felix L. Fischer

(57) ABSTRACT

A storage and preparation system for food or beverages employs a galley cart with a plurality of compartments. A container receivable in one of the plurality of compartments. The container has an identifier. A sensor is in each of said plurality of compartments and is adapted to read the identifier. An environmental system responsive to the sensor is associated with each of said plurality of compartments.

18 Claims, 9 Drawing Sheets

(56) References Cited

U.S. PATENT DOCUMENTS

| | | | |
|---|---|---|---|
| 2016/0251101 A1* | 9/2016 | Kong | B65B 35/30 |
| | | | 53/445 |
| 2016/0304207 A1* | 10/2016 | Carles | B64D 11/06 |
| 2017/0135383 A1* | 5/2017 | Liss | A23L 3/364 |
| 2017/0292713 A1* | 10/2017 | Boedicker | A23L 5/10 |
| 2017/0362072 A1 | 12/2017 | Garcia | |
| 2019/0055022 A1 | 2/2019 | Burd | |
| 2019/0362302 A1* | 11/2019 | Deemter | A47J 39/003 |

\* cited by examiner

GALLEY CART WITH SELECTABLE MEAL PREPARATION

BACKGROUND INFORMATION

Field

Implementations of the disclosure relate generally to the galley carts for food storage, transport, and preparation and, more particularly, a galley cart incorporating a system for selectable automated storage conditions and preparation of meals inserted in compartments within the galley cart.

Background

Galley carts are employed in various transportation and other industries, including airlines and passenger railways, for storage of meals and beverages and distribution of those meals and beverages to passengers. In typical applications, the galley carts may employ a dry ice compartment or other cooling system to maintain contents at reduced temperatures either for temporary storage or to serve chilled items. For most meals, attendants individually prepare meal trays by removing entrées from the galley carts, heating or otherwise preparing the entrée, reinserting the entrée or meal tray into the galley cart, and then serving. This multiple step process can be time consuming and may detract from other duties of the attendant or require additional staffing to be accomplished.

SUMMARY

Implementations disclosed herein provide a storage and preparation system for food or beverages having a galley cart with a plurality of compartments. A container is receivable in one of the plurality of compartments. The container has an identifier and a sensor in each of said plurality of compartments is adapted to read the identifier. An environmental system responsive to the sensor is associated with each of said plurality of compartments.

The implementations disclosed provide a method for storage and preparation of food or beverages wherein a container having an identifier is inserted into a compartment in a galley cart. The identifier is read with a sensor in the compartment and an environmental system associated with the compartment is controlled responsive to data read from the identifier.

BRIEF DESCRIPTION OF THE DRAWINGS

The features, functions, and advantages of the anti-personnel autonomous vehicle can be achieved independently in various implementations of the present disclosure or may be combined in yet other implementations further details of which can be seen with reference to the following description and drawings.

DETAILED DESCRIPTION

Implementations disclosed herein provide a system and method for food storage and preparation employed in transportable galley carts. The galley cart has a plurality of compartments that receive containers having prepackaged entrées. The container for the entrée includes an identifier that is read by a sensor in the compartment into which the container is inserted. An environmental system associated with each compartment then processes the entrée responsive to the information contained by the identifier.

Figure 1:
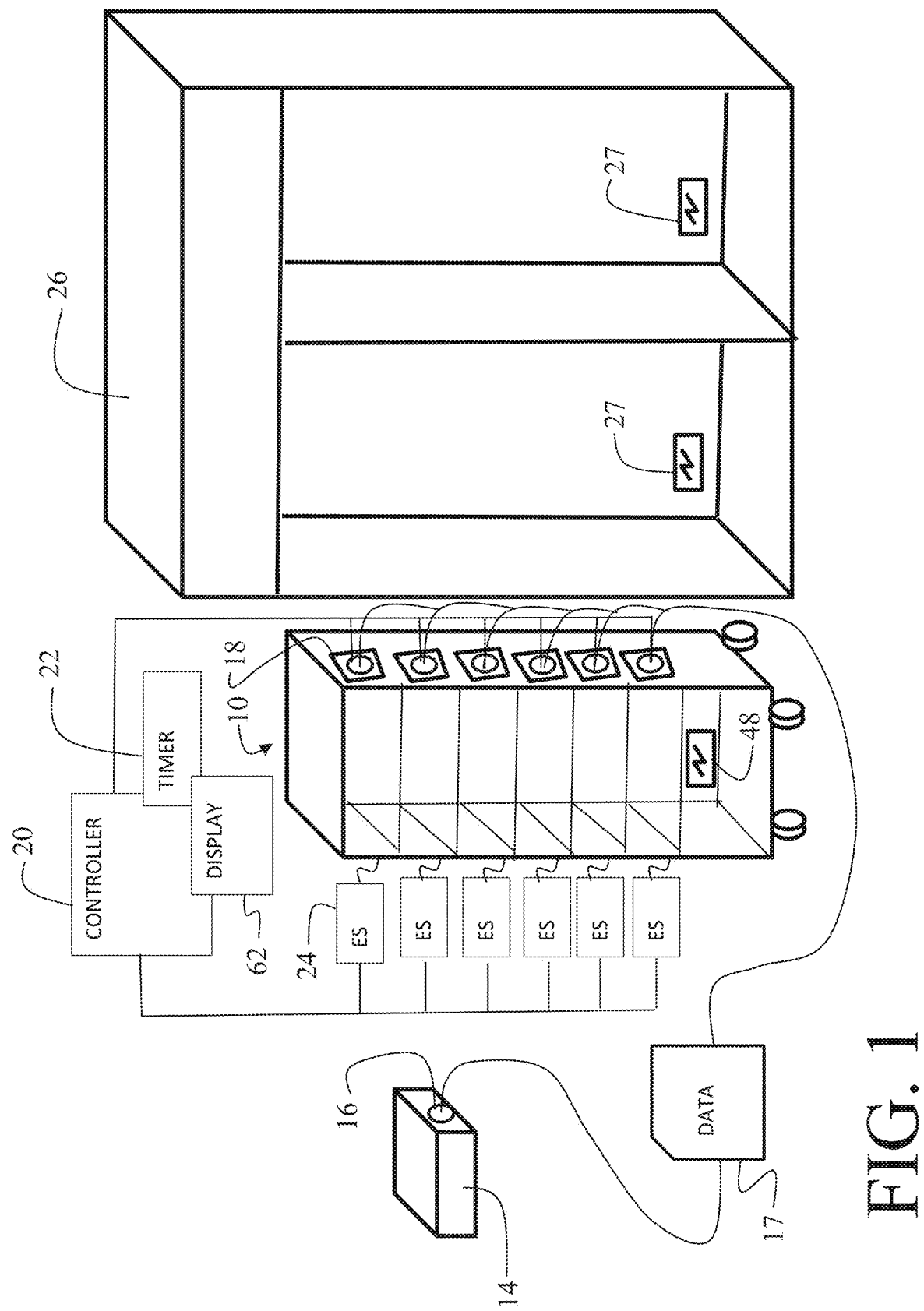
FIG. 1 is a block diagram of system components for the galley cart with selectable meal preparation.

Referring to the drawings, FIG. 1 shows a galley cart 10 having a plurality of compartments 12. A container 14 is configured to be received in one of the plurality of compartments. The container 14 includes an identifier 16. In the exemplary example, each container 14 is prepackaged with a meal or, in alternative applications, a beverage requiring preparation, both referred to herein as an "entrée". The identifier 16 is a physical device that is associated with data 17 defining the entrée and is physically attached to, imprinted on, or inserted in the container 14 (jointly described herein as "attached"). The data associated with the identifier 16 include one or more of an entrée description, information regarding the passenger ordering the entrée, and a timed preparation sequence for the entrée. A sensor 18 in each compartment 12 detects and reads the data 17 from the identifier 16 for a container 14 inserted into the compartment 12. A controller 20 receives the data 17 from the sensor 18 and a timer 22, which may be integral to the controller, that provides time information for use by the controller 20. An environmental system 24 in each compartment 12 provides cooling and/or heating capability to store and prepare the entrée in the container 14 based on command signals from the controller 20 responsive to the data 17 output from the sensor 18. The galley cart 10 may be stored in a galley 26 having power interfaces 27 for each galley cart.

The identifier 16 may be a Quick Response (QR) code or a bar code, that is printed on the container 14 or printed on a label that is then attached to the container 14. The identifier 16 can additionally or alternatively be an encodeable element, such as a Radio Frequency Identification (RFID) tag, remotely encoded while present in the container 14 or encoded and then inserted into the container 14. The entrée may be prepared and inserted in the container 14 based on an order from a passenger, as will be described in greater detail subsequently. Data regarding the entree including, for example, an entree name or type, a storage temperature and a heating time and/or temperature is determined and embedded in the data to be included in the identifier 16. Data regarding the ordering passenger, including flight or transportation information, source of the entrée, and desired service time may also be included. The identifier 16, if a QR code or bar code, is then printed on the container 14 or a label to be attached to the container, in a specified location to align with the sensor 18 when the container 14 is inserted in the compartment 12. If an RFID tag is employed as the identifier 16 the data may be transmitted to be embedded in the RFID tag.

Figure 2A:
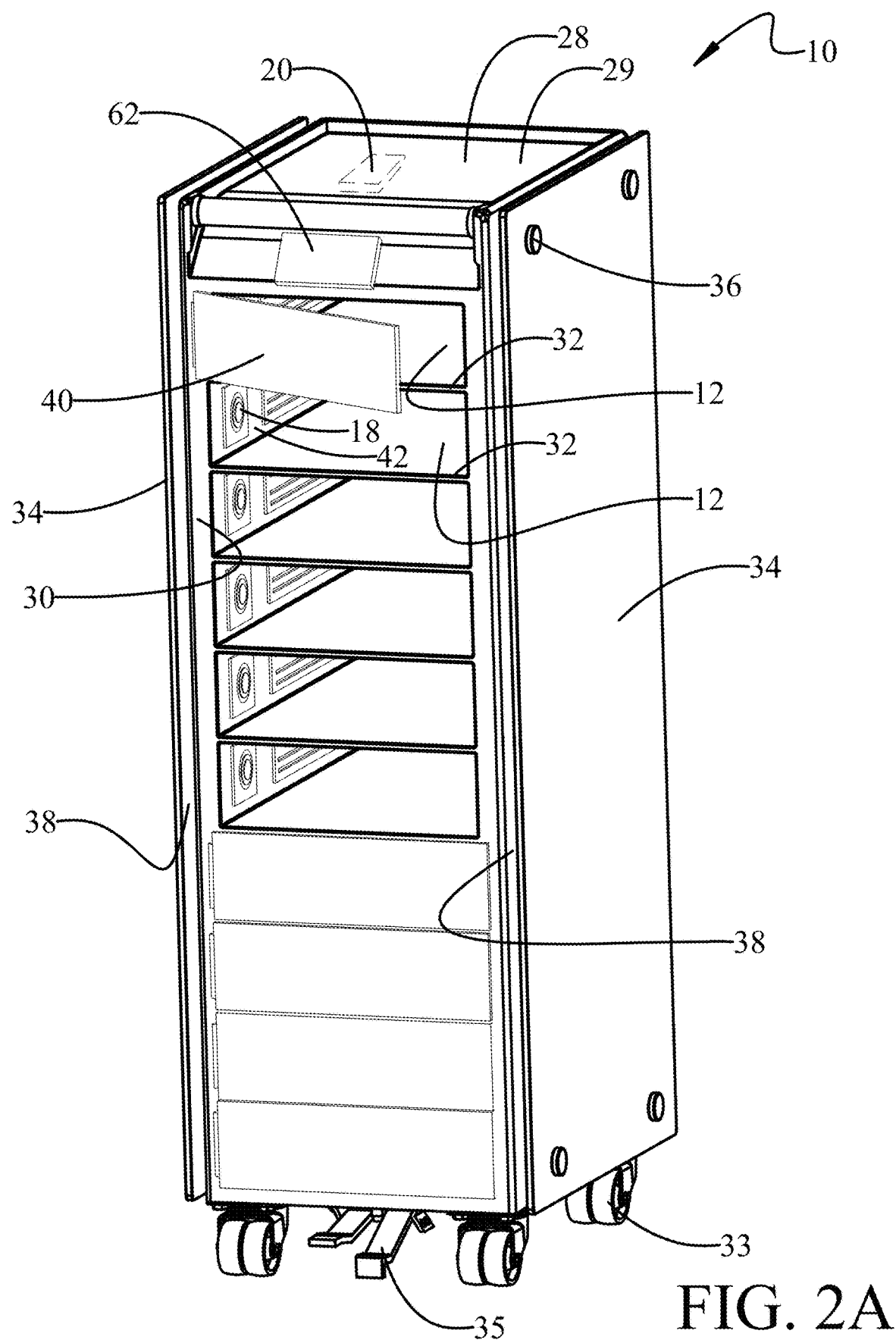
FIGS. 2A and 2B are pictorial representations of an implementation of the galley cart of FIG. 1.
Figure 2B:
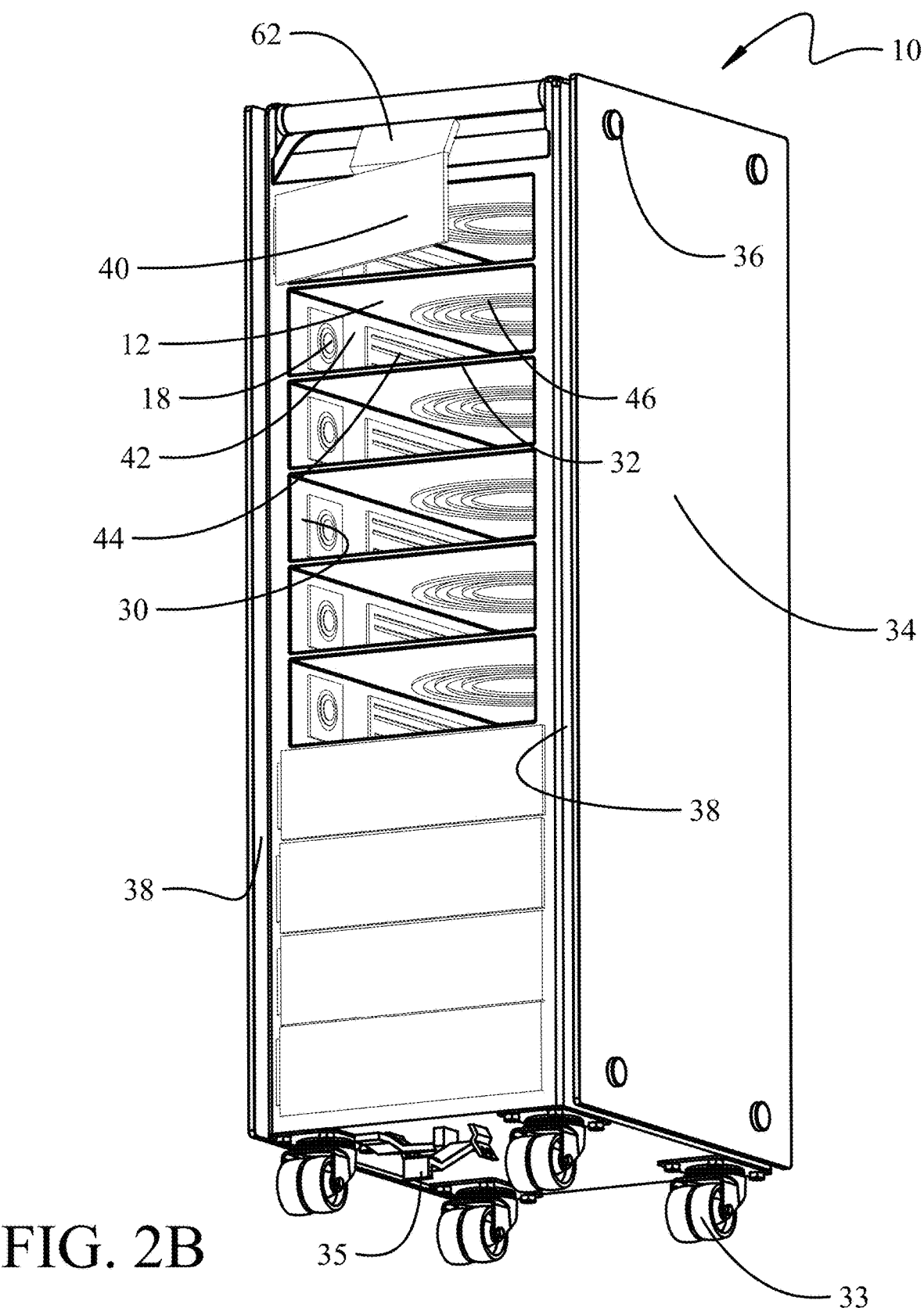

An implementation of the galley cart 10 is shown in FIGS. 2A and 2B. The galley cart 10 has a housing 28 incorporating sidewalls 30 and compartment separators 32 defining the individual compartments 12. The sidewalls 30 and compartment separators 32 are insulated to allow separate environmental control of each compartment. 12. The galley cart 10 may employ standard casters or wheels 33 with locking and unlocking levers 35 for mobility. Buffer panels 34 may be mounted to the sidewalls 30 with spacers 36. An air cavity 38 between the buffer panels 34 and sidewalls 30 further insulates the buffer panels 34 from the sidewalls 30 to substantially eliminate any tactile temperature differential, which may be created by the environmental system 24 in the compartments 12, upon contact with the cart 10 by attendants or passengers during meal service employing the carts 10.

Individual compartment doors 40 are employed in the exemplary embodiment for separate access to each compartment 12 (shown in the drawings with the door 40 of the first compartment 12 partially open, doors for the second through sixth compartments removed for clarity of interior details, and doors 40 for the $7^{th}$ through $10^{th}$ compartments closed). A single door on the front of the galley cart 10 or dual doors for each compartment 12 on both the front and back of the galley cart 10 may be employed for ease of access by the attendant. The sensor 18 is mounted on an interior wall 42 in each compartment 12. For use with QR code or bar code identifiers 16, the sensor 18 is a laser scanning unit. For use with RFID tag identifiers 16, an RFID sensor 18 is employed. Each compartment 12 may have multiple sensor types to accommodate containers 14 having various types of identifiers 16.

Figure 3:
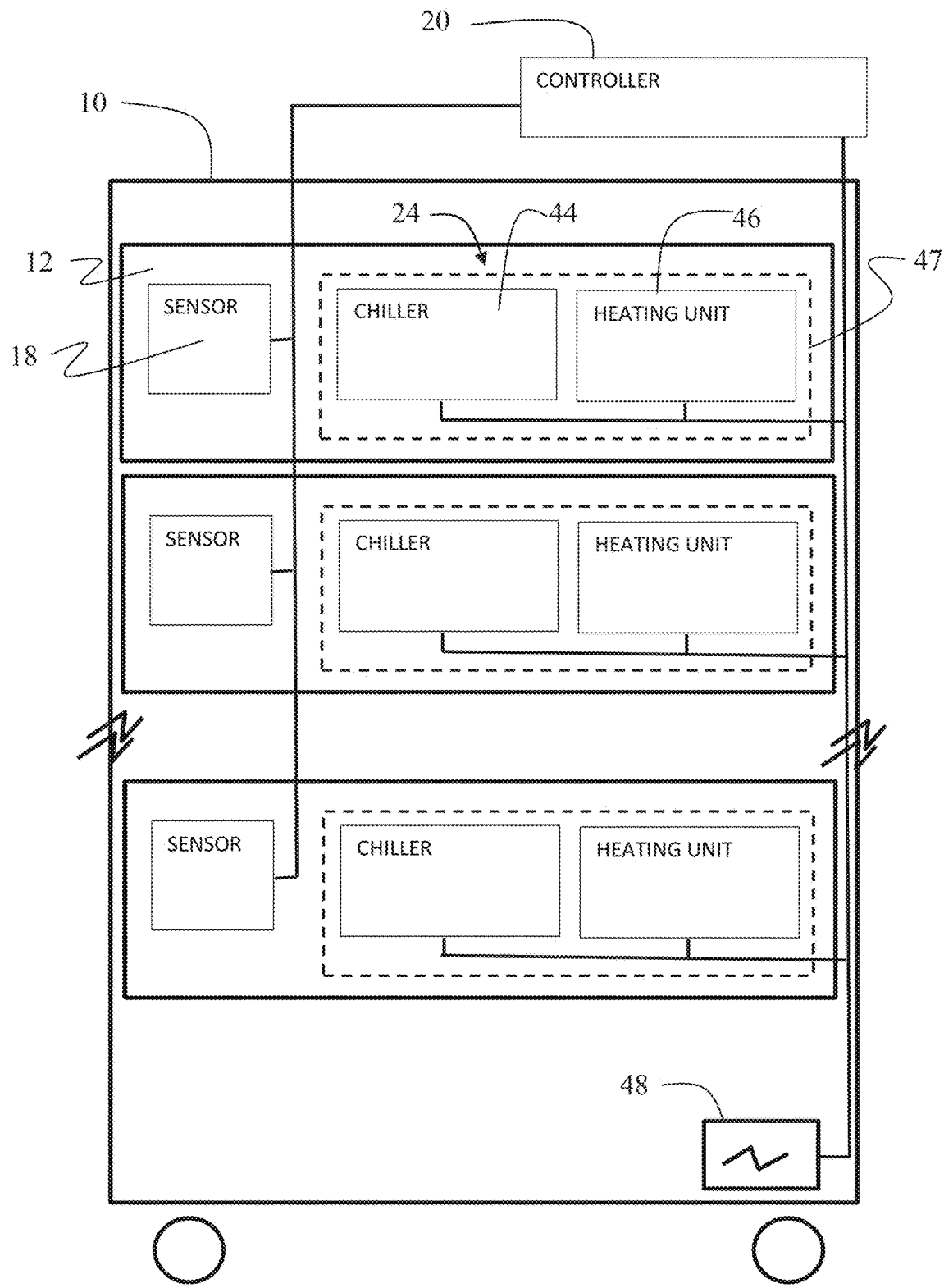
FIG. 3 is a block diagram of an exemplary environmental control system integrated in the compartments in the galley cart.

In one exemplary implementation as seen in FIG. 2B and FIG. 3, each compartment 12 has an associated environmental system 24 having a chiller 44 and a heating unit 46 for maintaining the entrée container 14 at desired temperatures responsive to the controller 20. The chiller 44 may be a Peltier device with either a fan and vent arrangement for convective cooling of the compartment or direct contact with the interior wall 42 for conductive cooling. The heating unit 46 may be an infrared heater, resistive coil heater, or microwave unit in exemplary implementations. The chiller 44 and heating unit 46 may be separate elements or may be present in a combined heater and chiller 47. Power for the environmental systems 24 may be supplied by connectors 48 mated with the power interfaces 27 in the galley 26 (seen in FIG. 1).

Figure 4:
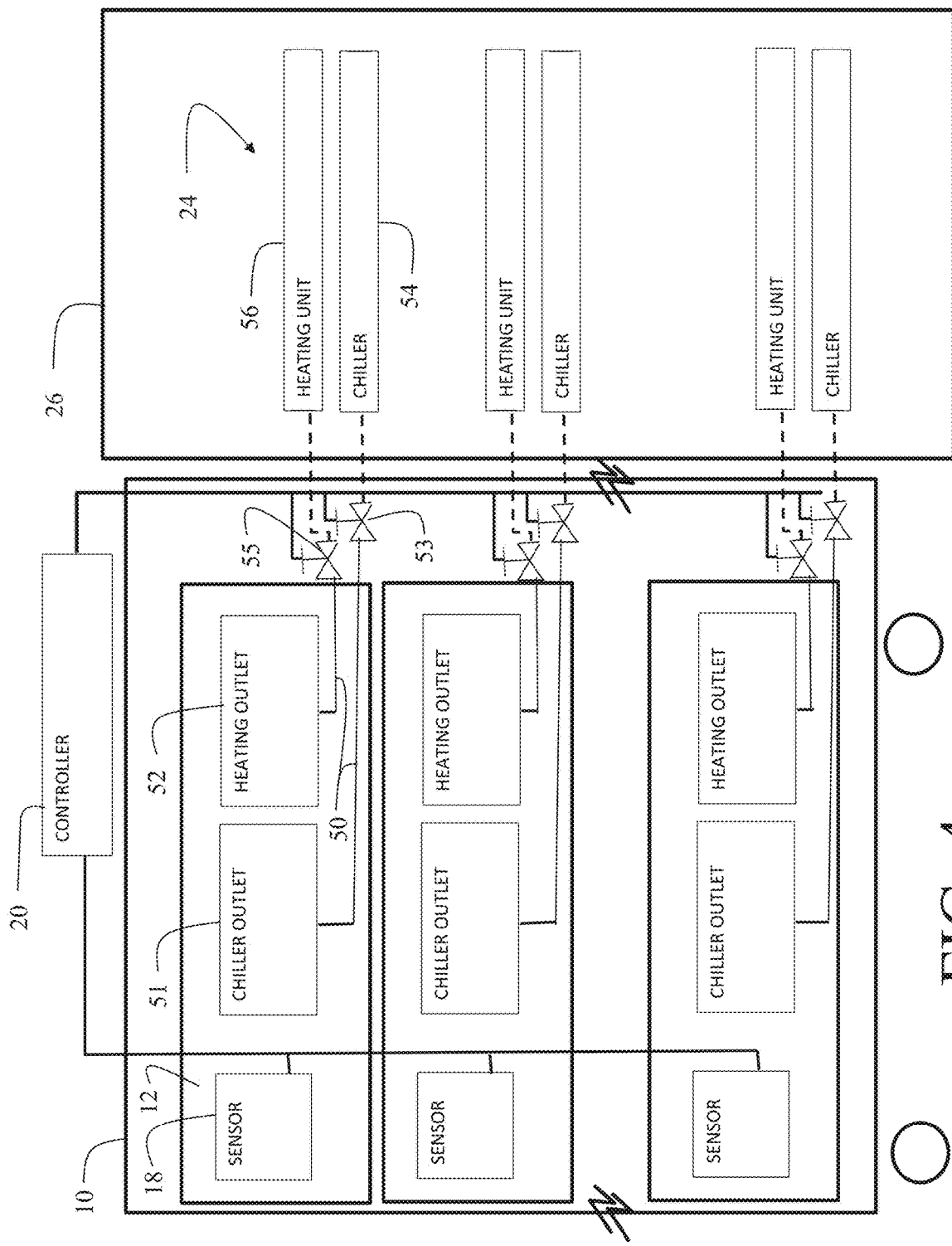
FIG. 4 is a block diagram of an exemplary environmental control system in the galley an ported into the galley cart.

In alternative embodiments as seen in FIG. 4, the environmental system 24 may be incorporated in the galley 26 and connection to the individual compartments 12 may be accomplished by working fluid conduits 50 in the sidewalls adjacent each compartment connecting chiller outlets 51 and heating outlets 52 through disconnectable valves 53 to chilling units 54 and valves 55 to heating units 56 in the galley. The valves 53, 55 are operable responsive to the controller 20. The heating and chilling units may be dedicated to individual compartments or may be centralized with controllable valves adjusting working fluid flow into the individual compartments for differing temperature control.

Figure 5:
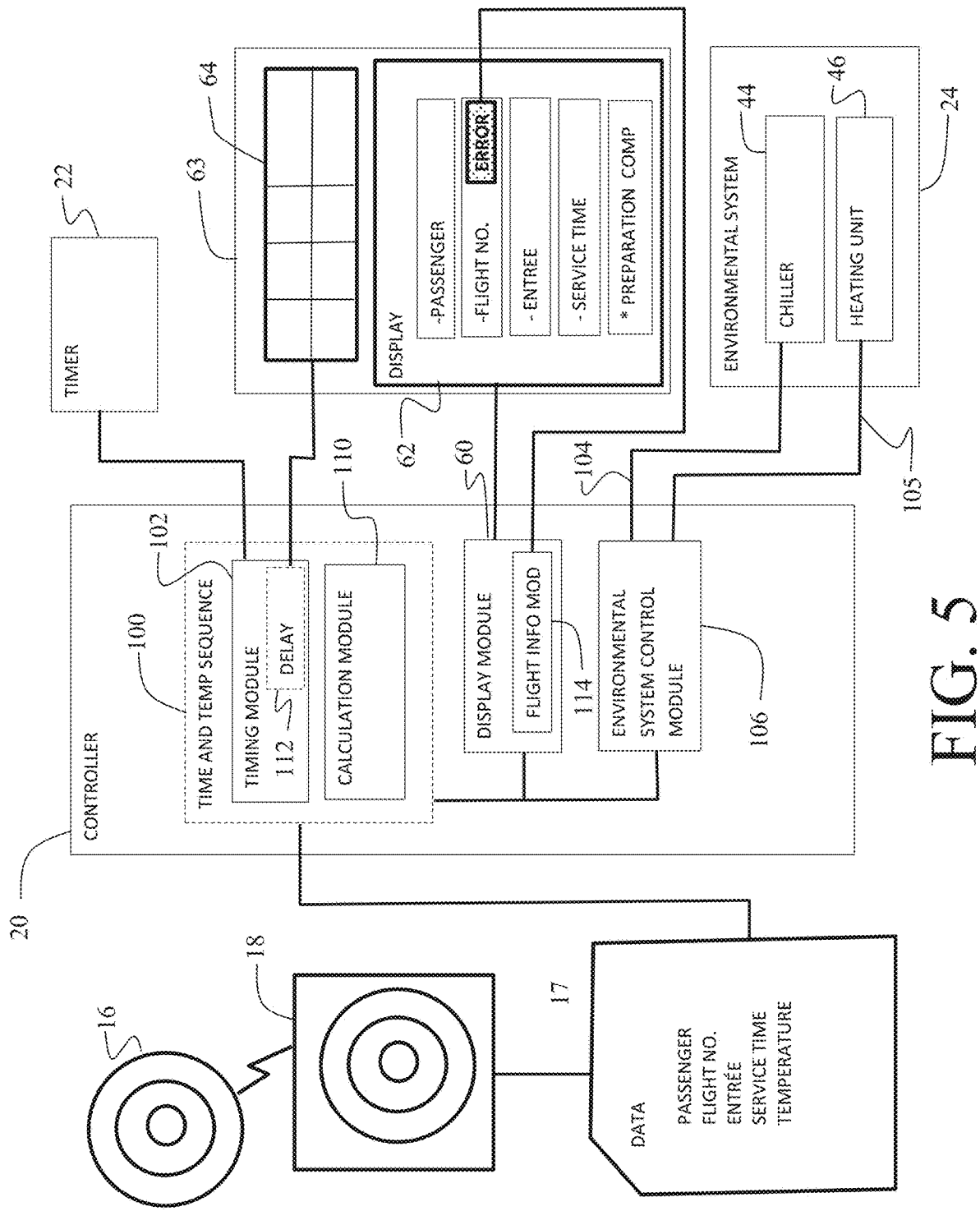
FIG. 5 is a schematic diagram of the controller and control inputs and outputs for the environmental system in the compartments of the galley cart.

Temperature control of each of the compartments 12 is accomplished by the controller 20 as shown in FIG. 5. The controller 20 may be incorporated in a top panel 29 of the galley cart 10 (as represented in FIG. 2A). For each compartment 12, based on the data 17 received from the sensor 18, the controller 20 determines a time and temperature sequence 100 for the entrée in the container 14 and monitors time data from the timer 22 in a timing module 102 to issue a command signal to the environmental system 24. If the desired service time has not been reached based on the time data from the timer 22, the controller 20 issues a storage command 104 from an environmental system control module 106 to the chiller 44 (or valves 53 associated with the chilling units) to maintain cooling of the container 14 for a defined time period in the compartment 12. If room temperature storage of the container 14 is indicated in the data 17, no command signal is issued to the environmental system control module 106.

Upon reaching a predetermined preparation time as determined by the timing module 102 based on the data 17 and the time data from the timer 22, the controller 20 issues a preparation command 108 through the environmental system control module 106 to the heating unit 46 (or valves 55 associated with the heating unit) to heat the compartment 12 for a second defined time period and container 14 to the desired temperature. The time and temperature sequence 100 defined in the data 17 may provide a heating time interval required for appropriate heating of the container 14 or may merely provide the desired service time and the controller 20 may calculate the heating time interval based on entrée type and capacity of the heating unit 46 in a calculation module 110.

The controller 20 incorporates a display module 60 to provide data to a display 62 regarding preparation status of the container 14 in each compartment 12 for viewing by the attendant. The display module 60 may also issue a preparation complete message when the desired service time or temperature has been reached. For a room temperature entrée in the container 14, the desired service time may be the sole display output. The display 62 may be integrated into the galley cart 10, as seen in FIG. 2, may incorporated in a point of service (POS) unit 63 carried by the attendant as represented in FIG. 5, and/or may be integrated into the galley. The display 62 may additionally provide touch screen controls 64 for input by the attendant to the controller 20.

The timer 22 or controller 20 may incorporate a delay module 112 controllable by the attendant to input a delay time, for example if the service time needs to be delayed based on a flight delay, for the timing sequence from the identifier 16 received in the data 17.

Figure 6:
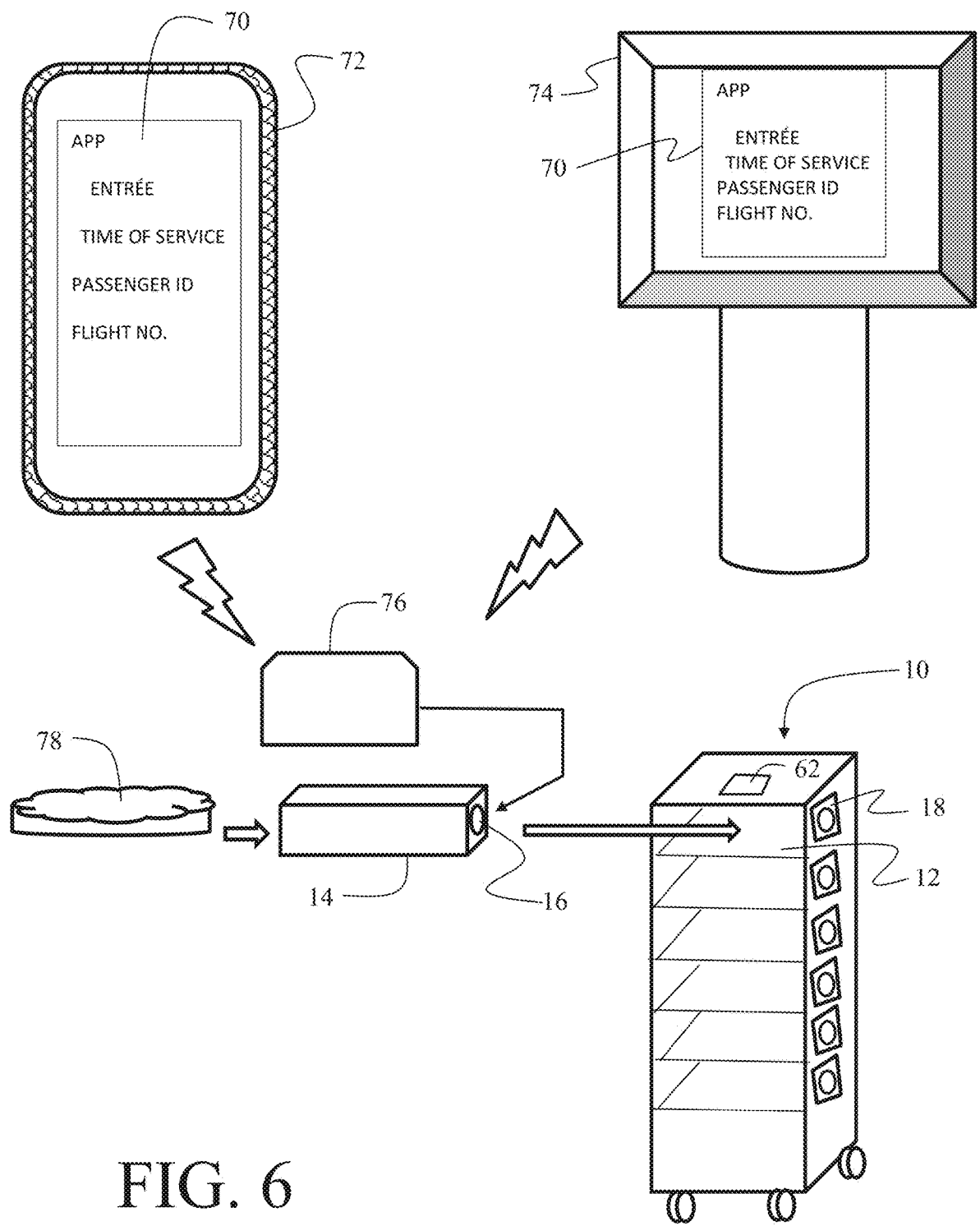
FIG. 6 is a block diagram of an order processing and information display system; and, FIGS. 7A and 7B are a flow chart of a method for storage and preparation of entrées employing the disclosed implementation.

As seen in FIG. 6, initial processing of a passenger entrée order may be received from an app 70 downloaded to the passenger's cell phone 72 or at a kiosk or similar fixed terminal 74. The app 70 may provide information input for desired time of service ("dinner" or a specific service time), the passenger's identification and travel information (flight number or similar data). The data from the app 70 is received at a loading terminal 76. The entrée 78 is then loaded into the container 14 and the information inserted in the identifier 16. The container 14 is then loaded into the appropriate galley cart 10 based on the identified travel information. The controller 20 in the galley cart 10 may include a flight information module 114 which verifies data 17 from the sensor 18 when the container 14 is inserted in the compartment 12 and an error message may be provided on the display 62 if the container has been inserted in the incorrect galley cart as shown in FIG. 5.

Figure 7A:
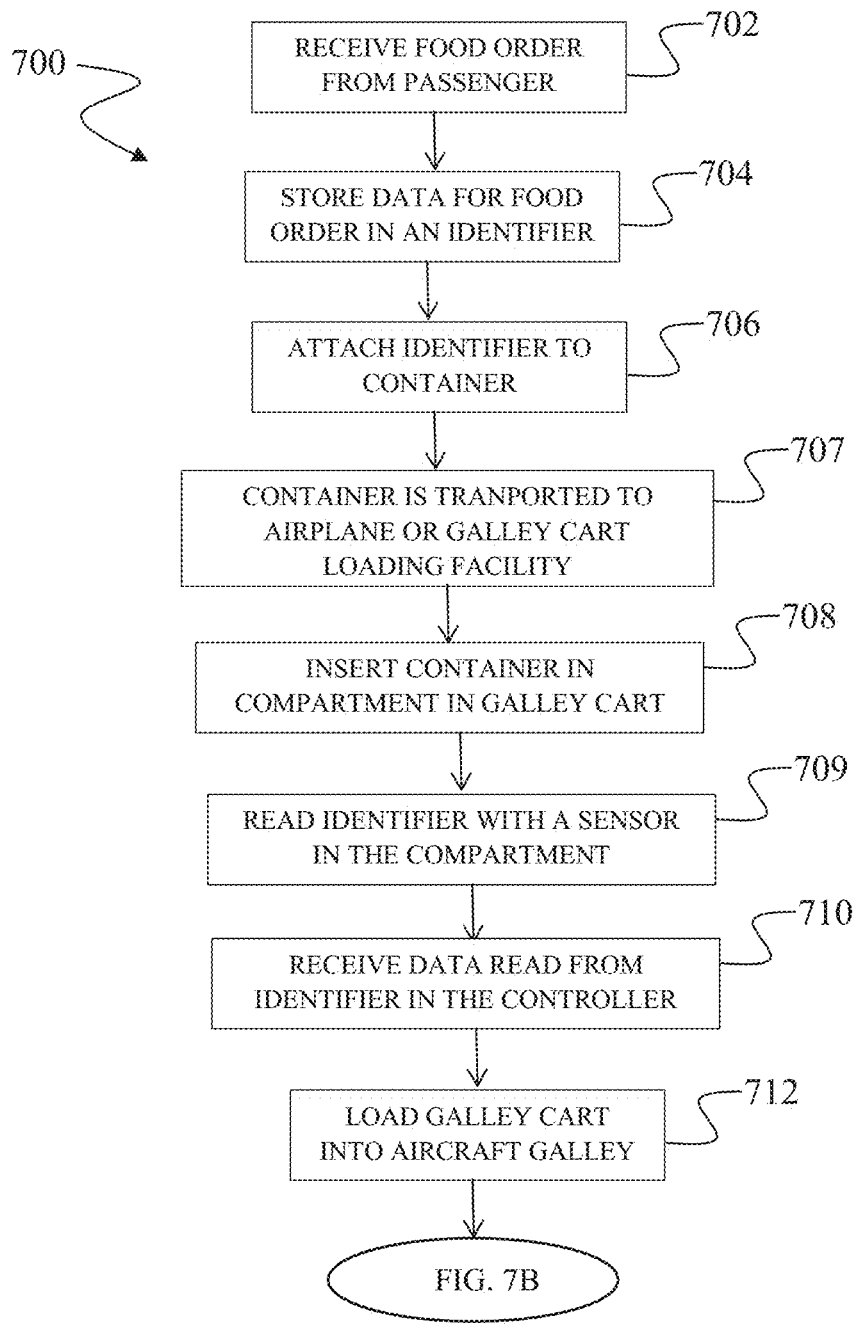
Figure 7B:
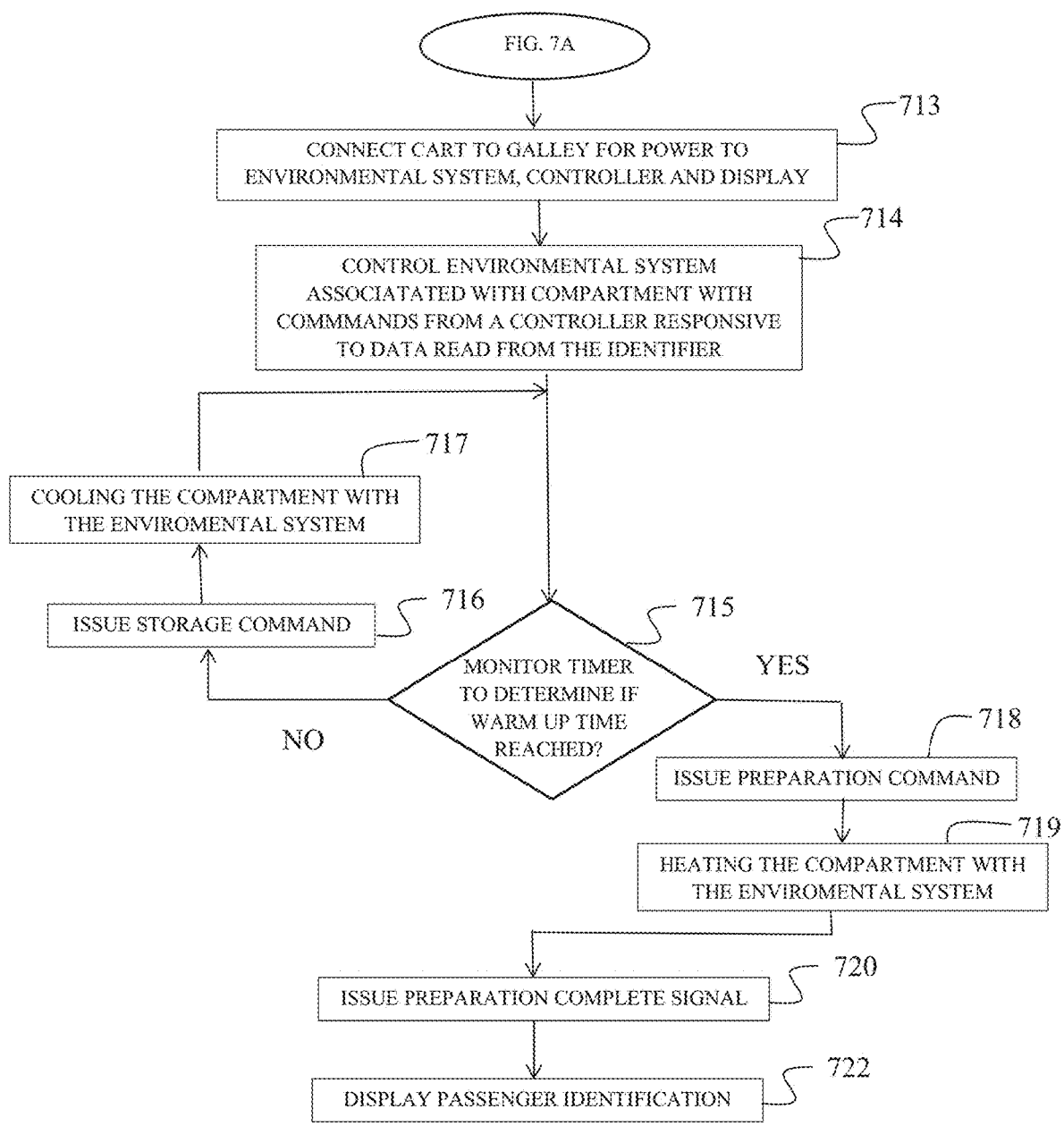

The implementations disclosed provide a method 700 for food storage and preparation as shown in FIGS. 7A and 7B. A food order is received from a passenger, step 702. Data for the food order, which may include the entrée type, serving temperature, serving time and passenger information, is stored in an identifier 16 such as a QR code, bar code, or RFID tag, step 704. The identifier 16 is then attached to a container 14, step 706. When the identifier 16 is the QR code or bar code, attaching the identifier 16 may include printing the code to a label and adhesively attaching the label to the container 14. The container 14 is transported by a caterer or authorized food preparer to the airplane or to a facility for loading of galley carts for the airplane, step 707. The container 14 having the identifier 16 is inserted into a compartment 12 in a galley cart 10, step 708. A sensor 18 in the compartment 12 reads the identifier 16, step 709, and data 17 read from the identifier is received in a controller 20, step 710. The galley cart 10 is loaded into an aircraft galley 26, step 712, and connected to the aircraft galley to provide power to an environmental system 24 associated with the compartment 12, a controller 20 and a display 62, 713. The environmental system 24 associated with the compartment is controlled with commands from the controller 20 responsive to data 17 read from the identifier 16, step 714.

The controller 20 monitors a timer 22 to determine if a "warm up" time has been reached, step 715. If not, the controller 20 issues a storage command 104, step 716, to cool the compartment 12 in which the container 14 has been placed with the environmental system 24 until a warm up time defined by the data 17 in the identifier 16 is reached, step 717. When the warm up time is reached, the controller 20 issues a preparation command 108, step 718, to initiate heating of the compartment 12 with the environmental system 24 such that the container 14 is heated to a temperature defined in the data 17, step 719. A preparation complete signal is then issued from the controller to the display 62, step 720. Passenger identification for the container 14 may be issued by the controller 20 for presentation on the display, step 722.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:

1. A storage and preparation system for food or beverages to be distributed on an airline flight or other transportation comprising:
    an app or kiosk receiving data for an order for an entree including desired time of service, a time and temperature profile for preparation of the entree, passenger identification and travel information;
    a loading terminal receiving data from the app or kiosk and configured to print an identifier including the data;
    a galley cart having a plurality of compartments;
    a container prepackaged with the entree receivable in one of said plurality of compartments, said container having the identifier attached;
    a sensor in each of said plurality of compartments, said sensor adapted to read the identifier;
    an environmental system responsive to output of the sensor associated with each of said plurality of compartments, said environmental system comprising a heater and a chiller configured to produce the time and temperature sequence;
    a timer; and
    a controller connected to the sensor and the timer, said controller issuing one or more command signals to the environmental system responsive to the time and temperature sequence data associated with the identifier;
    wherein the controller includes a display and a flight information module, said flight information module configured to verify data from the sensor when the container is inserted in the compartment and further configured to provide an error message on the display if the container has been inserted in an incorrect galley cart.

2. The storage and preparation system for food or beverages to be distributed on an airline flight or other transportation as defined in claim 1 wherein the identifier is a physical device comprising a QR code, an RFID tag, or a bar code.

3. The storage and preparation system for food or beverages to be distributed on an airline flight or other transportation as defined in claim 1 wherein in the controller issues a storage command to the environmental system responsive to a first time period output from the timer.

4. The storage and preparation system for food or beverages to be distributed on an airline flight or other transportation as defined in claim 3 wherein the controller issues a preparation command to the environmental system responsive to a second time period output from the timer.

5. The storage and preparation system for food or beverages to be distributed on an airline flight or other transportation as defined in claim 1 wherein the identifier is associated with data corresponding to an entre description and further comprising a display responsive to the controller and displaying a least one of entrée description and preparation status.

6. The storage and preparation system for food or beverages to be distributed on an airline flight or other transportation as defined in claim 5 wherein the display is responsive to the controller to display the passenger identification.

7. The storage and preparation system for food or beverages to be distributed on an airline flight or other transportation as defined in claim 5 wherein the controller issues a preparation complete message to the display.

8. A method for storage and preparation of food or beverages, the method comprising:
    receiving data through an app or kiosk for an entree order including desired time of service, a time and temperature profile for preparation, passenger identification and travel information;
    receiving the data from the app or kiosk at a loading terminal;
    printing in the loading terminal an identifier including the data;
    attaching the identifier to a container prepackaged with the entree receivable in one of a plurality of compartments in a galley cart, said container having the identifier attached;
    inserting the container into a selected compartment in the galley cart having
        a sensor in each of said plurality of compartments, said sensor adapted to read the identifier;
        an environmental system responsive to output of the sensor associated with each of said plurality of compartments, said environmental system comprising a heater and a chiller and a timer; and
        a controller connected to the sensor and timer and including a display and a flight information module, said flight information module configured to verify data from the sensor when the container is inserted in the selected compartment and further configured to provide an error message on the display if the container has been inserted in an incorrect galley cart; and
    reading the identifier with the sensor in the selected compartment; and
    controlling the environmental system associated with the selected compartment responsive to the time and temperature sequence read from the identifier.

9. The method as defined in claim 8 wherein the step of controlling comprises heating the container to a temperature defined in the data at a warm up time defined in the data.

10. The method as defined in claim 9 wherein the step of controlling further comprises cooling the container until the warm up time is reached.

11. The method as defined in claim 10 wherein the step of controlling further comprises:
receiving the data read from the identifier in the controller;
monitoring the timer with the controller; and
issuing a preparation command from the controller to initiate heating of the container upon reaching the warm up time.

12. The method as defined in claim 11 wherein the step of controlling further comprises issuing a storage command from the controller to maintain cooling of the container until reaching the warm up time.

13. The method as defined in claim 11 wherein the step of controlling further comprises issuing a preparation complete signal from the controller to the display.

14. The method as defined in claim 13 wherein the step of controlling further comprises presenting passenger identification for the container on the display.

15. The method as defined in claim 8 further comprising loading the galley cart into an aircraft galley.

16. The method as defined in claim 15 further comprising connecting the galley cart to the aircraft galley to provide power to the environmental system, the controller, and the display.

17. The storage and preparation system as defined in claim 1 wherein the compartments include sidewalls and buffer panels are mounted to the sidewalls with spacers providing an air cavity between the buffer panels and sidewalls insulating the buffer panels from the sidewalls whereby any tactile temperature differential, created by the environmental system, is mitigated for contact with the galley cart by attendants or passengers during meal service employing the galley cart.

18. The storage and preparation system as defined in claim 1 wherein the chiller comprises a Peltier device with one of a fan and vent arrangement for convective cooling of the compartment or direct contact with an interior wall for conductive cooling and the heater comprises one of an infrared heater, resistive coil heater, or microwave heater.

\* \* \* \* \*